US011526283B1

(12) United States Patent
Mallick et al.

(10) Patent No.: US 11,526,283 B1
(45) Date of Patent: Dec. 13, 2022

(54) LOGICAL STORAGE DEVICE ACCESS USING PER-VM KEYS IN AN ENCRYPTED STORAGE ENVIRONMENT

(71) Applicant: EMC IP Holding Company LLC, Hopkinton, MA (US)

(72) Inventors: Sanjib Mallick, Bangalore (IN); Amit Pundalik Anchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/375,641

(22) Filed: Jul. 14, 2021

(30) Foreign Application Priority Data

Jun. 8, 2021 (IN) .............................. 202141025456

(51) Int. Cl.
*G06F 12/00* (2006.01)
*G06F 3/06* (2006.01)
*G06F 9/455* (2018.01)

(52) U.S. Cl.
CPC .......... *G06F 3/0623* (2013.01); *G06F 3/0664* (2013.01); *G06F 3/0665* (2013.01);
(Continued)

(58) Field of Classification Search
CPC .... G06F 3/0623; G06F 3/0664; G06F 3/0665; G06F 3/0673; G06F 9/45558; G06F 2009/45583
See application file for complete search history.

(56) References Cited

U.S. PATENT DOCUMENTS 6,567,397 B1  5/2003 Campana et al.
6,687,746 B1  2/2004 Shuster et al.
(Continued)

FOREIGN PATENT DOCUMENTS

CN  103677927 B  2/2017
EP  1117028 A2  7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Gurtej Bansal
(74) *Attorney, Agent, or Firm* — Ryan, Mason & Lewis, LLP

(57) ABSTRACT

An apparatus in an illustrative embodiment comprises at least one processing device comprising a processor and a memory, with the processor coupled to the memory. The at least one processing device is configured to receive in a storage system, from a host device, information that identifies (i) a particular virtual machine implemented by the host device and (ii) a key specific to the virtual machine, to utilize at least a portion of the received information to obtain in the storage system the key specific to the virtual machine from a key management server external to the storage system, to store the obtained key in the storage system in association with one or more parts of the received information, and to utilize the obtained key to process input-output operations that are received in the storage system from the host device and that are identified as being associated with the virtual machine.

20 Claims, 4 Drawing Sheets

(52) U.S. Cl.
CPC ........ *G06F 3/0673* (2013.01); *G06F 9/45558* (2013.01); *G06F 2009/45583* (2013.01)

(56) References Cited

U.S. PATENT DOCUMENTS

| | | | |
|---|---|---|---|
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 8,959,173 | B1 * | 2/2015 | Robidoux ............. G06F 3/0619 709/215 |
| 9,026,694 | B1 | 5/2015 | Davidson et al. |
| 9,201,803 | B1 | 12/2015 | Derbeko et al. |
| 9,400,611 | B1 | 7/2016 | Raizen |
| 9,430,368 | B1 | 8/2016 | Derbeko et al. |
| 9,594,780 | B1 | 3/2017 | Esposito et al. |
| 9,647,933 | B1 | 5/2017 | Tawri et al. |
| 9,672,160 | B1 | 6/2017 | Derbeko et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,404,674 | B1 * | 9/2019 | Bshara ................. H04L 9/0894 |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,369 | B1 | 12/2019 | Mallick et al. |
| 10,606,496 | B1 | 3/2020 | Mallick et al. |
| 10,637,917 | B2 | 4/2020 | Mallick et al. |
| 10,652,206 | B1 | 5/2020 | Pusalkar et al. |
| 10,754,572 | B2 | 8/2020 | Kumar et al. |
| 10,757,189 | B2 | 8/2020 | Mallick et al. |
| 10,764,371 | B2 | 9/2020 | Rao et al. |
| 10,789,006 | B1 | 9/2020 | Gokam et al. |
| 10,817,181 | B2 | 10/2020 | Mallick et al. |
| 10,838,648 | B2 | 11/2020 | Sharma et al. |
| 10,880,217 | B2 | 12/2020 | Mallick et al. |
| 10,884,935 | B1 | 1/2021 | Doddaiah |
| 10,911,402 | B2 | 2/2021 | Pusalkar et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0201458 | A1 | 8/2008 | Salli |
| 2008/0301332 | A1 | 12/2008 | Butler et al. |
| 2009/0259749 | A1 | 10/2009 | Barrett et al. |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2012/0246345 | A1 | 9/2012 | Contreras et al. |
| 2013/0117766 | A1 | 5/2013 | Bax et al. |
| 2013/0339551 | A1 | 12/2013 | Flanagan et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0218406 | A1 * | 7/2016 | Sanford ................. H01P 3/127 |
| 2016/0335003 | A1 | 11/2016 | Ahmed et al. |
| 2017/0235507 | A1 | 8/2017 | Sinha et al. |
| 2017/0244557 | A1 * | 8/2017 | Riel ........................ H04L 9/088 |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |
| 2019/0334987 | A1 | 10/2019 | Mallick et al. |
| 2020/0021653 | A1 | 1/2020 | Rao et al. |
| 2020/0097203 | A1 | 3/2020 | Mallick et al. |
| 2020/0106698 | A1 | 4/2020 | Rao et al. |
| 2020/0110552 | A1 | 4/2020 | Kumar et al. |
| 2020/0112608 | A1 | 4/2020 | Patel et al. |
| 2020/0192588 | A1 | 6/2020 | Kumar et al. |
| 2020/0204475 | A1 | 6/2020 | Mallick et al. |
| 2020/0204495 | A1 | 6/2020 | Mallick et al. |
| 2020/0213274 | A1 | 7/2020 | Pusalkar et al. |
| 2020/0241890 | A1 | 7/2020 | Mallick et al. |
| 2020/0314218 | A1 | 10/2020 | Kumar et al. |
| 2020/0348860 | A1 | 11/2020 | Mallick et al. |
| 2020/0348861 | A1 | 11/2020 | Marappan et al. |
| 2020/0348869 | A1 | 11/2020 | Gokam |
| 2020/0349094 | A1 | 11/2020 | Smith et al. |
| 2020/0363985 | A1 | 11/2020 | Gokam et al. |
| 2020/0372401 | A1 | 11/2020 | Mallick et al. |
| 2021/0019054 | A1 | 1/2021 | Anchi et al. |
| 2021/0026551 | A1 | 1/2021 | Tidke et al. |
| 2021/0026650 | A1 | 1/2021 | Rao et al. |
| 2021/0157502 | A1 | 5/2021 | Rao et al. |
| 2021/0181965 | A1 | 6/2021 | Anchi et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "DELL EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 17/195,894 filed in the name of Amit Pundalik Anchi et al., filed Mar. 9, 2021, and entitled "Logical Storage Device Access Using Datastore-Level Keys in an Encrypted Storage Environment."

U.S. Appl. No. 17/331,041 filed in the name of Amit Pundalik Anchi et al., filed May 26, 2021, and entitled "Logical Storage Device Access Using Device-Specific Keys in an Encrypted Storage Environment."

* cited by examiner

LOGICAL STORAGE DEVICE ACCESS USING PER-VM KEYS IN AN ENCRYPTED STORAGE ENVIRONMENT

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments provide end-to-end encryption techniques in an encrypted storage environment, such as a storage environment comprising virtual storage volumes associated with respective virtual machines, using different keys that are specific to respective ones of the virtual machines. Such keys are also referred to herein as per-VM keys. These embodiments are advantageously configured to enhance data security while also improving IO processing performance.

For example, some embodiments provide end-to-end encryption of a virtual storage volume ("vVol") within a VMware Pluggable Storage Architecture (PSA) layer, illustratively using per-VM keys. The disclosed techniques can be similarly adapted to other storage environments involving end-to-end encryption of logical storage volumes or other types of logical storage devices.

In some embodiments, such techniques are illustratively provided at least in part utilizing multi-pathing software associated with a multi-path layer of one or more host devices. For example, at least portions of the disclosed functionality can be managed in some embodiments by a host driver, such as a multi-path input-output (MPIO) driver, in conjunction with processing of IO operations. The MPIO driver is illustratively part of a multi-path layer that is configured to process IO operations of at least one host device that communicates with one or more storage arrays or other types of storage systems. Other types of host drivers or other host device components can be used in place of or in addition to one or more MPIO drivers.

In one embodiment, an apparatus comprises at least one processing device that includes a processor and a memory, with the processor being coupled to the memory. The at least one processing device is configured to receive in a storage system, from a host device, information that identifies (i) a particular virtual machine implemented by the host device and (ii) a key specific to the virtual machine, to utilize at least a portion of the received information to obtain in the storage system the key specific to the virtual machine from a key management server external to the storage system, to store the obtained key in the storage system in association with one or more parts of the received information, and to utilize the obtained key to process IO operations that are received in the storage system from the host device and that are identified as being associated with the virtual machine.

The virtual machine implemented by the host device in some embodiments comprises at least one virtual storage volume. Metadata associated with the virtual storage volume illustratively comprises an encryption status indicator specifying whether or not encryption is enabled for the virtual storage volume.

Some embodiments overcome drawbacks of conventional techniques at least in part by allowing the storage system to implement data services such as compression and deduplication relating to data of the virtual storage volume. Additional or alternative advantages are provided in other embodiments.

The at least one processing device illustratively comprises at least a portion of the storage system, which is illustratively shared by the host device and one or more additional host devices arranged in a cluster, with each such host device implementing similar functionality. In some embodiments, each of the host devices comprises at least one MPIO driver configured to control delivery of IO operations to storage devices of the storage system over selected ones of a plurality of paths through a network.

In some embodiments, the at least one processing device further comprises at least a portion of the host device, one or more additional host devices, and/or a host management system that is configured to manage the host devices. Numerous alternative arrangements of one or more processing devices, each comprising a processor and a memory, with the memory coupled to the processor, can be used in other embodiments.

In some embodiments, a user-space portion of an MPIO driver of the host device obtains the key specific to the virtual machine from the key management server and provides the key specific to the virtual machine to a kernel-space portion of the MPIO driver of the host device. The kernel-space portion of the MPIO driver of the host device illustratively implements a host encryption engine configured to perform encryption and decryption of data of at least one virtual storage volume or other logical storage device associated with the virtual machine using the key specific to the virtual machine.

The received information in some embodiments illustratively comprises an identifier of the virtual machine, an identifier of the key specific to the virtual machine, and information characterizing an encryption status of the virtual machine. For example, the information characterizing the encryption status of the virtual machine may comprise an encryption status indicator that is part of metadata of the virtual machine.

At least portions of such received information are illustratively stored in at least one of a data structure of the storage system, and a self-describing header of at least one logical storage device associated with the virtual machine. Other storage arrangements can be used in other embodiments.

The received information may be received in the storage system at least in part via an out-of-band mechanism comprising at least one application programming interface (API).

Additionally or alternatively, the received information may be received in the storage system at least in part via an in-band mechanism comprising at least one command issued by an MPIO driver of the host device. For example, the at least one command illustratively comprises at least one vendor unique command or other type of command of a storage access protocol, such as a SCSI access protocol or an NVMe access protocol, utilized by the host device to access the storage system over a network. Such a command in some embodiments may comprise a particular command descriptor block that is configured to include the identifier of the key specific to the virtual machine.

In some embodiments, the at least one processing device is further configured to receive a given one of the IO operations, to determine a virtual machine identifier for the given IO operation, and to utilize the virtual machine identifier to access at least one data structure within the storage system to obtain the key specific to the virtual machine for use in processing the given IO operation.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
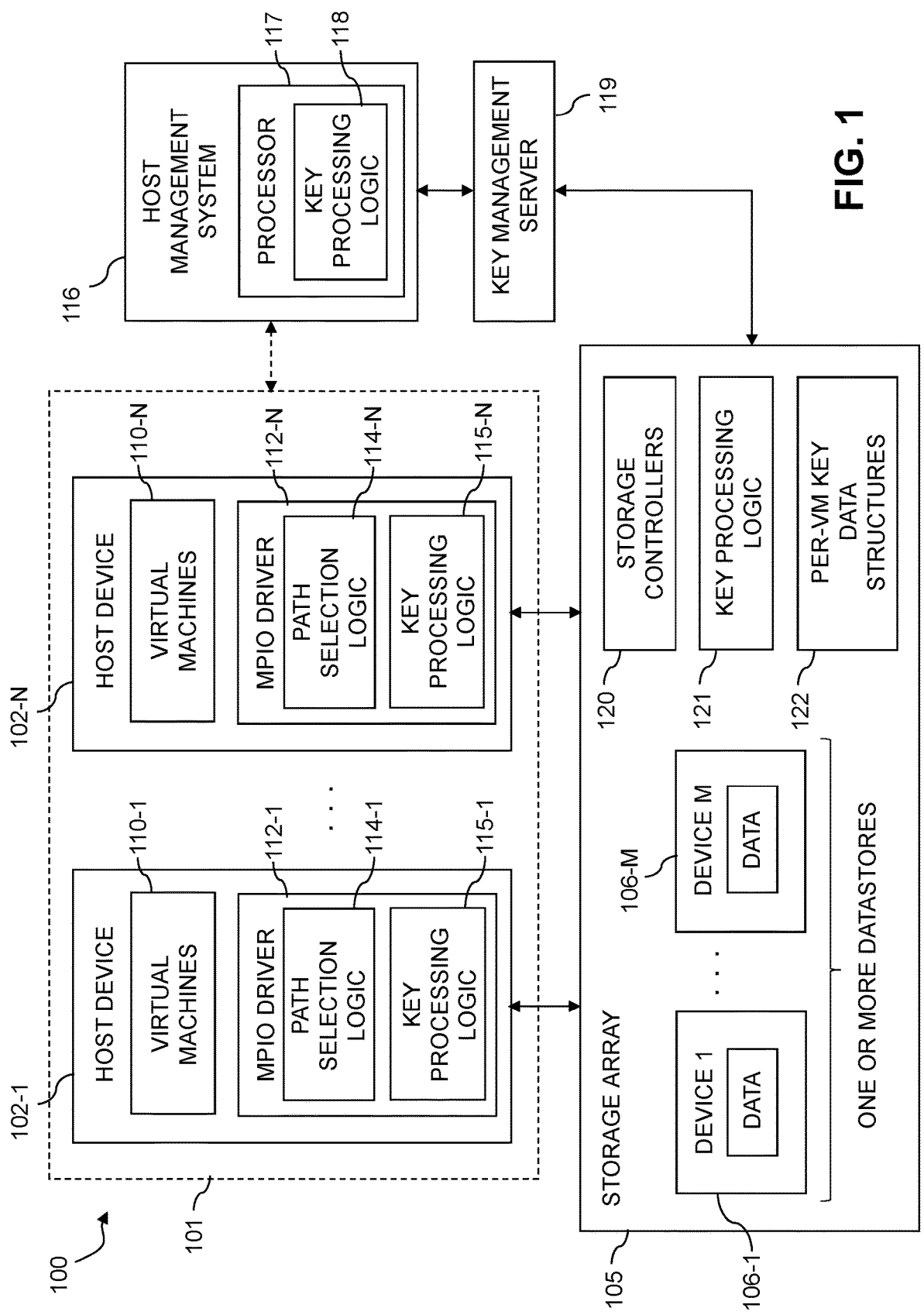
FIG. 1 is a block diagram of an information processing system configured with functionality for logical storage device access in an encrypted storage environment in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N, where N is an integer greater than or equal to two. The host devices 102 communicate over a storage area network (SAN) with at least one storage array 105. The SAN is not explicitly shown in this figure, but is assumed to interconnect the host devices 102 and the storage array 105. Other types of networks can be used in other embodiments.

The storage array 105 comprises a plurality of storage devices 106-1, . . . 106-M each storing data utilized by one or more applications running on one or more of the host devices 102, where M is also an integer greater than or equal to two. The storage devices 106 implement a plurality of logical storage volumes or other types of logical storage devices, in any of a wide variety of different types of storage arrangements, such as storage pools, datastores or other storage arrangements.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN. For example, in the present embodiment, the host devices 102 are assumed to comprise respective sets of virtual machines 110. The host devices 102 may therefore be implemented as part of a compute services platform or other type of processing platform that includes virtual machines. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Such LUNs or other logical storage volumes can include so-called virtual volumes that are associated with a virtual machine, and are considered examples of what are more generally referred to herein as "logical storage devices."

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102 and the storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN may be implemented using multiple networks of different types to interconnect storage system components. For example, the SAN may comprise a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The SAN in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of virtual machines 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for logical storage device access in an encrypted storage environment as disclosed herein. Such functionality is provided at least in part using respective instances of key processing logic 115-1, . . . 115-N implemented within the MPIO drivers 112. Such instances of key processing logic 115 operate in conjunction with other key processing logic instances of other system components to implement algorithms of the type described elsewhere herein.

The MPIO drivers 112 may comprise, for example, otherwise conventional MPIO drivers, such as PowerPath® drivers from Dell Technologies, suitably modified in the manner disclosed herein to provide functionality for logical storage device access in an encrypted storage environment. Other types of MPIO drivers from other driver vendors may be suitably modified to incorporate functionality for logical storage device access as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises a host management system 116 that includes a processor 117 implementing key processing logic 118. The host management system 116 in some embodiments comprises at least one VMware vCenter server configured to manage a cluster of host devices 102 comprising respective ESXi servers each implementing a plurality of VMs, although numerous other arrangements are possible. Embodiments disclosed herein that utilize vCenter servers are therefore only illustrative examples, and should not be construed as limiting in any way.

Additionally or alternatively, the host management system 116 can comprise an MPIO management station that is configured to interface with the MPIO drivers 112 of the host devices 102 as well as the storage array 105. Such an MPIO management station provides management functionality for the multi-path layer comprising the MPIO drivers 112 of the host devices 102. In some embodiments, host device management software executing on the MPIO management station interacts with storage array management software executing on the storage array 105. The MPIO management station, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station is an example of what is more generally referred to herein as an "external server" relative to the storage array 105. Additional or alternative external servers of different types can be used in other embodiments, such as one or more of the above-noted VMware vCenter servers. In some embodiments, one or more external servers, such as the one or more VMware vCenter servers and/or the MPIO management station, are configured to perform at least a portion of the logical storage device access functionality disclosed herein, illustratively in cooperation with the storage array 105 and the instances of key processing logic 115 of the respective MPIO drivers 112.

The system 100 additionally comprises a key management server 119 that is illustratively coupled to the host management system 116 and the storage array 105. The key management server 119 is utilized to provide per-VM keys to the host devices 102 and to the storage array 105, and possibly to additional system components such as the host management system 116, in a manner to be described in greater detail below.

Such operations illustratively involve execution of algorithms or portions of such algorithms, as disclosed herein, by key processing logic instances 115, 118 and 121 in the respective host devices 102, host management system 116 and storage array 105. Examples of such algorithms implemented at least in part by key processing logic instances 115, 118 and 121 of system 100 are described in more detail elsewhere herein.

The MPIO driver 112-1 is configured to deliver IO operations selected from a corresponding set of IO queues of the host device 102-1 to the storage array 105 via selected ones of multiple paths over the SAN. The set of IO queues is not explicitly shown in the figure, but is assumed to be implemented using memory of the host device 102-1. The sources of the IO operations stored in the set of IO queues illustratively include respective processes of one or more applications executing on the virtual machines 110-1 of the host device 102-1. For example, IO operations can be generated by each of multiple processes of a database application running on one or more of the virtual machines 110-1 of the host device 102-1. Such processes issue IO operations for delivery to the storage array 105 over the SAN. Other types of sources of IO operations may be present in a given implementation of system 100.

A given IO operation is therefore illustratively generated by a process of an application running on the host device 102-1, and is queued in a given one of the IO queues of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN in order to determine the negotiated rate. The term "negotiated rate" therefore illustratively comprises a rate negotiated between an initiator or a target and a switch of a switch fabric of the SAN. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1G, 2G, 4G, 8G, 16G, 32G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues of the host device 102-1 to the storage array 105 over particular paths via the SAN. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations from the set of IO queues is more generally referred to herein as "path selection." Path selection as that term is broadly used herein can in some cases involve both selection of a particular IO operation and selection of one of multiple possible paths for accessing a corresponding logical storage device of the storage array 105. The corresponding logical storage device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

An MPIO management station of the type mentioned above may be arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The above-noted MPIO management station in some embodiments is similarly configured to communicate directly with the storage array 105 using one or more such storage access protocols.

As indicated previously, the MPIO driver 112-1 on the host device 102-1 illustratively has connectivity to an MPIO management station. The MPIO management station in some embodiments implements PowerPath® Management Appliance (PPMA) functionality to obtain access to the storage array 105. The MPIO driver 112-1 can obtain from the MPIO management station certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of the MPIO management station. Such host multi-pathing software can be configured to facilitate logical storage device access in an encrypted storage environment as disclosed herein. For example, multi-pathing software residing on one or more of the host devices 102 (e.g., a server such as an ESXi server or an AIX server) is utilized in illustrative embodiments to support logical storage device access in an encrypted storage environment.

In the FIG. 1 embodiment, the storage array 105 comprises a plurality of storage controllers 120, key processing logic 121, and corresponding per-VM key data structures 122 for respective ones of the host devices 102. The per-VM key data structures 122 illustratively comprise tables or other types of data structures that store keys on a per virtual machine basis for a plurality of virtual machines associated with at least one of the host devices 102. In other embodiments, one or more of the key processing logic 121 and the corresponding per-VM key data structures 122 can be implemented at least in part external to the storage array 105 rather than internal to the storage array 105. For example, in some embodiments at least portions of the key processing logic 121 and corresponding per-VM key data structures 122 are implemented on one or more servers that are external to the storage array 105, such as in an MPIO management station or in another type of external server.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on an MPIO management station, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, illustrative embodiments overcome various drawbacks of conventional practice by configuring the system 100 to include functionality for logical storage device access in an encrypted storage environment, as will now be described in more detail.

In operation, the MPIO driver 112-1 is configured to control delivery of IO operations from its corresponding host device 102-1 to storage array 105 over selected ones of a plurality of paths through SAN, wherein the paths are associated with respective initiator-target pairs, the initiators being implemented on the host device 102-1 and the targets being implemented on the storage array 105.

The paths over which IO operations are delivered from the host device 102-1 to the storage array 105 under the control of the MPIO driver 112-1 are assumed to be associated with respective initiator-target pairs, with the initiators of the initiator-target pairs illustratively comprising respective HBAs of the host device 102-1 and the targets of the initiator-target pairs illustratively comprising respective storage array ports of the storage array 105. Other types of paths involving other types of initiators and targets can be used in other embodiments.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is an implementation of system 100 involving multiple VMs, for example, where the multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, the multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

The other MPIO drivers 112 of the other host devices 102 are assumed to operate in a similar manner as that described above for MPIO driver 112-1 of host device 102-1.

Each of the host devices 102 is an example of what is more generally referred to herein as "at least one processing device" comprising a processor and a memory, with the processor being coupled to the memory.

Similarly, the storage array 105, or portions thereof, is an example of "at least one processing device" comprising a processor and a memory.

Accordingly, illustrative embodiments disclosed herein include apparatus comprising at least one processing device, with the at least one processing device comprising at least a portion of a given one of the host devices 102, one or more other ones of the host devices 102, the storage array 105, and/or the host management system 116 that is configured to manage the host devices 102. Numerous alternative arrangements of one or more processing devices, each comprising a processor and a memory, with the memory coupled to the processor, can be used in other embodiments.

The storage array 105 in some embodiments implements functionality for facilitating access of host devices 102 to encrypted logical storage devices of an encrypted storage environment in the following manner.

The storage array 105 is illustratively configured to receive, from at least a given one of the host devices 102 over the SAN, assumed by way of example to be host device 102-1, information that identifies (i) a particular virtual machine implemented by the host device 102-1 and (ii) a key specific to the virtual machine. The storage array 105 utilizes at least a portion of the received information to obtain the key specific to the virtual machine from the key management server 119 external to the storage array 105. The obtained key is also referred to herein as a per-VM key, where VM denotes virtual machine, and is stored in the storage array 105 in association with one or more parts of the received information, possibly using one or more data structures. The storage array 105 utilizes the obtained key to process IO operations that are received in the storage array 105 from the host device 102-1 and that are identified as being associated with the virtual machine.

For example, the storage array 105 may be configured, responsive to receipt of at least one IO operation from the host device 102-1 relating to at least one of reading or writing encrypted data of a virtual storage volume or other logical storage device associated with the virtual machine, to utilize the obtained key to access the encrypted data in unencrypted form in the storage array 105. As a more particular example, with regard to IO operations that involve writing encrypted data to the logical storage device associated with the virtual machine, the storage array 105 can utilize the obtained key to decrypt the encrypted data in order to perform compression and deduplication, and then encrypt the compressed and deduplicated data before saving it to persistent storage.

Such an arrangement is an example of what is more generally referred to herein as an "encrypted storage environment," although other types of encrypted storage environments can be used in other embodiments.

It should be noted that the term "unencrypted form" as used herein is intended to be broadly construed, and is not limited to unencrypted or plaintext data. For example, data in some embodiments may be stored using multiple layers of encryption, and "unencrypted form" in such an arrangement is intended to encompass data that is unencrypted relative to a per-VM key but may nonetheless still be encrypted under one or more other keys associated with one or more other encryption layers.

The virtual machine implemented by the host device 102-1 in some embodiments comprises at least one virtual storage volume (e.g., a vVol). Metadata associated with the virtual storage volume illustratively comprises an encryption status indicator specifying whether or not encryption is enabled for the virtual storage volume. As indicated above, other types of logical storage devices can be used.

It should be noted that the term "virtual machine" as used herein is intended to be broadly construed so as to encompass a wide variety of different types of virtualization infrastructure, including, by way of example, Linux containers. Also, a virtual machine "implemented by" a host device is assumed to execute in whole or in part on that host device, possibly with involvement of additional components such as a hypervisor that may be part of the same host device or another separate device.

In some embodiments, a user-space portion of the MPIO driver 112-1 of the host device 102-1 obtains the key specific to the virtual machine from the key management server 119 and provides the key specific to the virtual machine to a kernel-space portion of the MPIO driver 112-1 of the host device 102-1. Other arrangements are possible. For example, a kernel-space portion of the MPIO driver 112-1 can be configured to obtain the key specific to the virtual machine from the key management server 119, without involvement of any user-space portion of the MPIO driver 112-1. Such an arrangement is appropriate, for example, in embodiments in which the MPIO driver 112-1 does not include any user-space portion.

The kernel-space portion of the MPIO driver 112-1 of the host device 102-1 illustratively implements a host encryption engine configured to perform encryption and decryption of data of at least one virtual storage volume or other logical storage device associated with the virtual machine using the key specific to the virtual machine. Such a host encryption engine implemented within the kernel-space portion of the MPIO driver 112-1 illustratively encrypts data to be written to the logical storage device associated with the virtual machine, and decrypts data to be read from that logical storage device.

As indicated above, the storage array 105 illustratively receives, from host device 102-1 and similarly for one or more other ones of the host devices 102, information that identifies (i) a particular virtual machine implemented by the host device 102-1 and (ii) a key specific to the virtual machine. The key specific to the virtual machine is also referred to herein as a per-VM key.

This received information in some embodiments more particularly comprises an identifier of the virtual machine, an identifier of the key specific to the virtual machine, and information characterizing an encryption status of the virtual machine. For example, the identifier of the virtual machine can comprise a universally unique identifier (UUID) of the virtual machine, although other types of identifiers can be used. Additionally or alternatively, the information characterizing the encryption status of the virtual machine may comprise an encryption status indicator that is part of metadata of the virtual machine.

At least portions of such received information are illustratively stored in at least one of a data structure of the storage array 105, and a self-describing header of at least one logical storage device associated with the virtual machine. Other storage arrangements can be used in other embodiments.

The received information may be received in the storage array 105 at least in part via an out-of-band mechanism comprising at least one application programming interface (API).

Additionally or alternatively, the received information may be received in the storage array 105 at least in part via an in-band mechanism comprising at least one command issued by an MPIO driver 112-1 of the host device 102-1.

For example, the at least one command illustratively comprises at least one vendor unique command or other type of command of a storage access protocol, such as a SCSI access protocol or an NVMe access protocol, utilized by the host device 102-1 to access the storage array 105 over the SAN. Such a command or commands in some embodiments may comprise a particular command descriptor block that is configured to include the identifier of the key specific to the virtual machine.

In some embodiments, the storage array 105 is further configured to receive a given one of the above-noted IO operations, to determine a virtual machine identifier for the given IO operation, and to utilize the virtual machine identifier to access at least one data structure within the storage array 105 to obtain the key specific to the virtual machine for use in processing the given IO operation.

Terms such as "key specific to a virtual machine" or "per-VM key" as used herein are intended to be broadly construed, and may encompass, for example, a symmetric key, an asymmetric key, a key of a private-public key pair, or another type of cryptographic key, as well as combinations of multiple keys, possibly associated with different layers of encryption in a multi-layer encryption arrangement. For example, some embodiments may utilize device-specific keys associated with respective encryption-enabled logical storage devices, in addition to the per-VM keys disclosed herein.

In some embodiments, the host devices 102 that share the storage array 105 are arranged in a cluster, with each such host device implementing similar functionality. For example, each of the host devices 102 can provide the storage array 105 with information that identifies (i) a particular virtual machine implemented by the host device 102-1 and (ii) a key specific to the virtual machine, for each of one or more virtual machines implemented by the corresponding one of the host devices 102.

The host devices 102 in some embodiments comprise respective ESXi servers each implementing multiple virtual machines. Such host devices are illustratively managed by the host management system 116 and each accesses one or more logical storage volumes of the storage array 105. For example, the host management system 116 in such an embodiment can comprise one or more vCenter servers, configured to provide a centralized management utility for a plurality of ESXi hosts and the virtual machines implemented by those hosts. Other types of host management systems and corresponding host devices can be used in other embodiments. The term "host management system" as used herein is therefore intended to be broadly construed, and can comprise, for example, one or more servers, such as one or more vCenter servers in embodiments involving ESXi hosts, as well as additional or alternative components, such as an MPIO management station.

As indicated above, the host devices 102 in some embodiments comprise a cluster of host devices collectively managed by the host management system 116, and in such an arrangement the host management system 116 illustratively performs management functions such as, for example, a reboot of at least one of the host devices of the cluster and/or addition of one or more new host devices to the cluster.

The storage array 105 illustratively stores information such as an identifier, an encryption status indicator and a per-VM key for each of a plurality of virtual machines in one of the per-VM key data structures 122 that it illustratively maintains for each of the host devices 102. An example of such a data structure will be described below in conjunction with FIG. 4. The per-VM key data structures 122 may also be used to store additional or alternative information.

As noted above, operations described herein as being performed by one of the MPIO drivers 112 utilizing its instances of path selection logic 114 and key processing logic 115 can be similarly performed in other ones of the MPIO drivers 112 of other ones of the host devices 102. Additionally or alternatively, one or more of the above-described operations in other embodiments can be performed utilizing one or more other components of the host devices 102 and/or the storage array 105.

An example of a process including logical storage device access operations of the type outlined above will be described below in conjunction with the flow diagram of FIG. 2. These and other operations referred to herein as being performed by one or more host devices operating in conjunction with at least one storage array of a storage system can in other embodiments involve additional or alternative system components, such as host management system 116 and key management server 119.

As disclosed herein, aspects of logical storage device access in an encrypted storage environment are illustratively performed by each of the instances of key processing logic 115 in respective ones of the MPIO drivers 112 of the multi-path layer. However, it is to be appreciated that additional or alternative components such as host management system 116 and key management server 119 can participate in one or more operations relating to logical storage device access in other embodiments. Terms such as "logical storage device access" and "key processing" as used herein are intended to be broadly construed, so as to encompass a wide variety of additional or alternative arrangements for facilitating access to logical storage devices by one or more host devices.

These and other illustrative embodiments disclosed herein provide functionality for logical storage device access in an encrypted storage environment, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 in a manner that provides enhanced logical storage device access in an encrypted storage environment comprising host devices 102 and storage array 105.

A more detailed example of an algorithm involving at least first and second ones of the host devices 102 utilizing their respective MPIO drivers 112 and their respective corresponding instances of path selection logic 114 and key processing logic 115 will now be described. Such components are configured to interact with the storage array 105 which implements portions of the disclosed functionality within what is generally referred to herein as an "encrypted storage environment."

In some embodiments, an encrypted storage environment is part of an end-to-end encryption arrangement, in which application data is encrypted in a host device ("host") and sent encrypted to a storage array, also referred to herein as simply an "array." In some implementations of this type, the array does not have the encryption keys, and instead just saves the encrypted data. In other implementations, the array has the encryption keys, and it decrypts the data to allow compression and deduplication, and then may encrypt the compressed and deduplicated data before saving it to persistent storage, illustratively referred to below as "disk" but not limited to any particular type of storage medium.

In such a storage environment with end-to-end encryption, where data of one or more logical storage volumes or other logical storage devices is saved in encrypted form to disk, problems can arise.

For example, VMware currently provides an encryption solution to individual VMs that in some implementations can prevent a storage system from performing compression and deduplication data services. In the existing VMware solution, as the complete LUN is not encrypted, for a storage system to apply these additional data services it will need to have knowledge of which IO has encrypted data and which IO does not, as well as knowledge of or access to the encryption keys used by the host to encrypt the data. Such information is required in order for the storage system to apply the additional data services such as compression and deduplication.

Implementing a VMware ESXi deployment in a cluster increases the complexity of supporting multiple hosts and adds overhead of supporting certain major clustering features like movement of applications and/or VMs using vMotion functionality when using VM-level encryption.

These and other problems of conventional practice are overcome using techniques disclosed herein.

For example, illustrative embodiments disclosed herein address such problems by providing an end-to-end encryption solution, suitable for use with a VMware deployment as well as in a wide variety of other encrypted storage environments.

Some embodiments disclosed herein configure MPIO drivers of multi-pathing software of a multi-path layer of one or more host devices to facilitate access to data of logical storage devices in encrypted storage environments, such as the above-noted embodiments involving end-to-end encryption.

In a vSphere environment, it is common to create a virtual machine file system (VMFS) datastore construct over SAN-based storage. VMFS is a distributed clustered file system that provides rich vSphere features and functionalities to applications and VMs, such as high availability (HA), vMotion, etc. that allow applications to move between the hosts of the cluster without any disruption. A VMware datastore not only supports traditional LUNs but also virtual volumes ("vVols") that are commonly used in vSphere environments.

The VMFS datastore is illustratively spanned or otherwise distributed across multiple LUNs or other types of logical storage devices, and supports operations like VMFS expansion by adding more LUNs or other types of logical storage devices to the VMFS. A vVol datastore in some embodiments is configured as a storage container of vVol objects, where such a storage container is illustratively accessible via a storage fabric through a Protocol Endpoint (PE) serving as a data path.

A VMware datastore is one example of a deployment use case of illustrative embodiments disclosed herein for storing encrypted data of multiple LUNs or other logical storage devices. Such an arrangement when implemented using techniques as disclosed herein advantageously permits the leveraging of additional data services, such as compression and deduplication in the storage system, as described in more detail elsewhere herein.

The example algorithm and other illustrative embodiments disclosed herein in some implementations utilize or comprise at least a subset of the following components:

1. Key Management Server (KMS)—an external key management server that provides a key for encryption when requested by a host encryption client/agent of a host management system or other similar system component. An example of the KMS is the key management server 119 of the FIG. 1 embodiment. The KMS in illustrative embodiments herein can supply keys to host devices 102, storage array 105 and host management system 116.

2. Host Encryption Client/Agent—a FIPS-compliant client and/or agent that manages communication to the external KMS through a secure KMIP channel, where FIPS denotes Federal Information Processing Standards, and KMIP denotes Key Management Interoperability Protocol. A FIPS-compliant client and/or agent illustratively obtains one or more keys from the KMS for use in encrypting data in accordance with a cryptographic algorithm, such as an algorithm implementing the well-known Advanced Encryption Standard (AES) or other suitable cryptographic algorithm. Illustrative embodiments herein are not limited in terms of the particular types of keys and cryptographic algorithms that may be used. In some embodiments herein, the host encryption client/agent is implemented as a component of a vCenter server or other type of host management system, such as host management system 116 of the FIG. 1 embodiment, although other arrangements can be used.

3. Host Encryption Engine—a host software component that encrypts/decrypts all of data read/written to one or more LUNs, vVols or other logical storage devices using corresponding per-VM keys as disclosed herein. In some embodiments, the host encryption engines are implemented in respective MPIO drivers of multiple host devices, such as in MPIO drivers 112 of host devices 102 in the FIG. 1 embodiment.

Examples of KMS components that are used natively by storage systems include Vormetric and Thales for providing encryption functionality, although others can be used. The above-noted VMware VM encryption solution implements a component in a vCenter server that communicates with third-party KMS components of the type noted above and requests an encryption key using a key identifier that is mapped to per VM and is locally cached.

An example MPIO driver referred to as PowerPath® has a kernel-space driver component that is advantageously utilized in some embodiments. Such embodiments illustratively modify a PowerPath® driver or other type of MPIO driver to implement techniques for end-to-end encryption as disclosed herein.

In some embodiments, PowerPath® serves as an encryption engine that will perform encryption and decryption operations for IOs directed to vVols or other types of logical storage devices.

As noted above, it is desirable to provide end-to-end encryption of vVols and other logical storage devices in a manner that allows the storage array to decrypt the encrypted data in order to perform data services like compression and deduplication.

In the existing VMware vVol encryption approach, there is no mechanism to share keys between an ESXi host and the storage array. The storage array needs a host-based encryption solution which not only should be able to communicate with KMS using KMIP and encrypt IOs in flight but should also allow the storage array to use the same keys to decrypt the data for compression and deduplication.

Illustrative embodiments herein provide a solution for vVol level encryption which meets the above-noted needs and has no dependency on the existing VMware vVol encryption approach. Moreover, it is readily adaptable to other storage environments that implement end-to-end encryption.

In some embodiments, PowerPath® is implemented as a plugin within the VMware PSA framework. PowerPath® illustratively includes at least two components, a kernel-space driver component and a user-space management component. These components may be viewed as examples of what are more generally referred to herein as respective kernel-space and user-space portions of an MPIO driver. The user-space management component may be implemented as a Small Footprint CIM Broker (SFCB) plugin, where CIM denotes Common Information Model. The SFCB plugin is an example of a CIM Object Manager (CIMOM) provider. This PowerPath® CIMOM provider can function as a host encryption client/agent by opening a secured socket (e.g., a TLS socket) to communicate with the KMS using the KMIP protocol. The CIMOM maintains classes for each VM object and has all the information related to storage mapped to a VM. This enables the PowerPath® CIMOM provider to discover or otherwise learn about VMs hosted on its corresponding host.

The PowerPath® kernel-space driver component can proactively discover all vVols currently bound to a protocol end point by means of an in-band mechanism currently supported by the VMware vVol specification. PowerPath® can also learn the vVol ID in the context of an IO destined to a particular vVol. The PowerPath® kernel-space driver component illustratively serves as an encryption engine that will encrypt/decrypt data for all incoming IOs directed to vVols. Some embodiments herein are configured to support VMware cryptography libraries, third-party cryptography libraries and/or storage array trusted cryptography libraries.

As will be described, certain operations of the algorithm are illustratively performed in kernel space of respective MPIO drivers 112 of the host devices 102, to avoid user-space security attacks.

The above-noted example algorithm for implementing the logical storage device access techniques disclosed herein illustratively includes the following steps, although additional or alternative steps can be used. References below and elsewhere herein to PowerPath® generally refer to a modified version configured to implement techniques as disclosed herein, and other types of MPIO drivers or multi-pathing software can be used. The steps in the example algorithm are illustratively separated into host-side operations, storage-side operations, and VMware operations, as described below.

As indicated above, it is desirable in many storage environments to provide end-to-end encryption of VMs, in a manner that allows the storage array to decrypt the data for a VM and perform data services such as compression and deduplication on the decrypted data. VMware already has per-VM encryption, illustratively implemented using a VAIO filter within the virtual IO stack in VMware, where VAIO generally denotes vSphere APIs for I/O Filtering, but in such an implementation, the storage array does not have access to the encryption key for the IO data and hence is unable to decrypt the IO data to perform the above-noted data services. As will be described in more detail below, illustrative embodiments herein provide algorithms which overcome these and other drawbacks.

In some embodiments, per-VM encryption is implemented within a PSA using PowerPath® or another type of MPIO driver. However, such arrangements can present challenges. For example, VMs are typically carved out from LUNs, and therefore the same LUN hosting multiple VMs will have different keys, and the storage array will need to know which IO should be decrypted with which key, and would need to have some mechanism for persisting the various keys within the storage array.

Illustrative embodiments disclosed herein provide techniques for end-to-end encryption on a per-VM basis such that the storage array can decrypt the IO data for compression, deduplication and/or other data services.

An example algorithm for implementing the logical storage device access techniques as disclosed herein is described below. It is assumed in the context of this example that there is a KMS which can be accessed from ESXi hosts using KMIP. The PowerPath® user-space management component (e.g., an extension of a CIM provider) opens a TLS channel with the KMS using KMIP to obtain keys. It is further assumed that the storage array also has access to the same KMS using KMIP.

The algorithm in the present example illustratively includes the following steps, although additional or alternative steps can be used.

1. When encryption is enabled for a VM, the VM metadata is updated with encryption status in a VM configuration file (e.g., VMX), a VM CIMOM object, or other file, object or data structure accessible to the PowerPath® user-space management component.

2. During VM creation, PowerPath® obtains the universally unique identifier (UUID) of the new VM.

3. PowerPath® receives the key and corresponding Key ID for the VM UUID from the KMS and caches the key and corresponding Key ID within the PowerPath® driver.

4. PowerPath® sends the VM UUID and Key ID associated with a logical storage device to the storage array using a log select command or other suitable command (e.g., log sense and/or mode sense commands). The storage array saves the Key ID, illustratively within a self-describing header of the logical storage device or other suitable location.

5. The storage array obtains from the KMS the key corresponding to the Key ID for the VM UUID and caches the obtained key within a table or other data structure in a memory of the storage array.

6. For read/write IO, PowerPath® fetches the VM UUID from each IO, retrieves the Key ID, and sends it to the storage array with the IO. In the case of read IO, PowerPath® uses the corresponding key to decrypt encrypted data returned by the storage array, and in the case of write IO, PowerPath® uses the corresponding key to encrypt data for delivery to the storage array. The sending of the Key ID to the storage array with the IO illustratively involves populating a custom command descriptor block (CDB) with the Key ID, as will be described in more detail below, although other arrangements can be used.

7. The storage array receives the Key ID and fetches the corresponding key from the table or other data structure described in step 5 and uses the key to encrypt/decrypt IO data.

8. For write IO, the storage array decrypts the IO encrypted by PowerPath® and applies data services such as compression and deduplication.

An example of a custom CDB that may be utilized in the above algorithm is as follows. The write 16 and read 16 CDBs upper high bits, which are illustratively beyond typical storage capacities, and the "group number" field in CDB which is typically unused, are combined in some embodiments herein and utilized by PowerPath® to push Key ID information from the host device to the storage array. The storage array uses the Key ID obtained from the custom CDB to retrieve the corresponding key. Other types and arrangements of commands and associated CDBs can be used to convey the Key ID and other related information from one or more host devices to a storage array.

This particular algorithm is presented by way of illustrative example only, and other embodiments can use other types of algorithms with additional or alternative steps to provide the disclosed functionality. For example, certain steps illustrated as being performed serially can instead be performed at least in part in parallel with one another. The particular steps of the above-described example algorithm, and other algorithms disclosed herein, are illustrative only, and should not be considered limiting in any way.

Such an algorithm in some embodiments is implemented by cooperative interaction of key processing logic instances in multiple system components, such as instances of key processing logic 115, 118 and 121 in the respective host devices 102, host management system 116 and storage array 105 in the FIG. 1 embodiment.

Illustrative embodiments herein provide significant advantages over conventional arrangements in which logical storage volumes or other types of logical storage devices are encrypted.

For example, some embodiments are advantageously configured to provide enhanced access to logical storage volumes or other types of logical storage devices in encrypted storage environments, using SCSI access protocols, NVMe access protocols and/or other storage access protocols.

Moreover, illustrative embodiments disclosed herein provide a storage multi-pathing driver such as a PowerPath® driver or other type of MPIO driver supporting access to logical storage devices in an encrypted storage environment in an efficient and secure manner.

Some embodiments provide a PSA level end-to-end encryption solution within VMware for vVols. Such arrangements overcome the drawbacks of conventional VMware VM level encryption arrangements.

Moreover, some embodiments overcome drawbacks of conventional techniques at least in part by allowing the storage system to implement data services such as compression and deduplication relating to data of logical storage devices subject to end-to-end encryption in an encrypted storage environment.

Some embodiments provide enhanced access to logical storage devices in an encrypted storage environment for a wide variety of different types of host devices and their corresponding storage systems, such as host devices comprising ESXi servers or other types of servers, and the illustrative embodiments can provide significantly improved security in these and numerous other contexts.

Portions of the above-described algorithms and other related techniques and functionality disclosed herein are illustratively implemented by a given MPIO driver on a corresponding host device, and similarly by other MPIO drivers on respective other host devices. Such MPIO drivers illustratively form a multi-path layer or MPIO layer comprising multi-pathing software of the host devices. Other types of multi-pathing software and host drivers can be used in other embodiments. Additionally or alternatively, other host device components can be used to implement at least portions of the disclosed logical storage device access functionality.

Also, ESXi and other host environments referred to herein are used as non-limiting examples only, and the same or similar techniques can be used in a wide variety of other host device environments.

Although VU commands are used in illustrative embodiments herein, other types of commands can be used in other embodiments. For example, various types of log sense, mode sense and/or other "read-like" commands, possibly including one or more commands of a standard storage access protocol such as the above-noted SCSI and NVMe access protocols, can be used in other embodiments.

Additional examples of logical storage device access arrangements will be described elsewhere herein in conjunction with the embodiments of FIGS. 2 through 4. Other types of logical storage device access arrangements can be used in other embodiments.

These and other functions related to logical storage device access that are referred to herein as being performed by or under the control of the MPIO drivers 112 through interaction with the storage array 105 can in some embodiments be performed at least in part outside of MPIO drivers 112 utilizing other system components.

The above-described functions associated with logical storage device access in the MPIO driver 112-1 in some embodiments are carried out at least in part under the control of its key processing logic 115-1, illustratively operating in cooperation with path selection logic 114-1. For example, the key processing logic 115-1 is illustratively configured to control performance of portions of an algorithm comprising one or more steps of the process in the flow diagram to be described below in conjunction with FIG. 2, or at least portions of other algorithms disclosed herein. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN with the storage array 105. For example, the MPIO drivers 112 of such other host devices are each similarly configured to deliver IO operations from a corresponding set of IO queues to the storage array 105 over selected paths through the SAN, and to perform the disclosed functionality for logical storage device access.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known MPIO functionality such as that of otherwise conventional PowerPath® drivers from Dell Technologies. Such conventional MPIO functionality is suitably modified in illustrative embodiments disclosed herein to support logical storage device access in encrypted storage environments, using per-VM keys.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, storage array 105, storage devices 106, virtual machines 110, and MPIO drivers 112, including their corresponding instances of path selection logic 114 and key processing logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising two or more host devices and a storage system. The storage system in this embodiment is assumed to comprise at least one storage array having a plurality of storage devices. The storage devices illustratively include logical storage devices such as LUNs or other logical storage volumes that store encrypted data for the host devices in an encrypted storage environment. For example, such logical storage volumes in the FIG. 2 embodiment are more particularly assumed to comprise virtual volumes ("vVols") associated with respective virtual machines.

Figure 2:
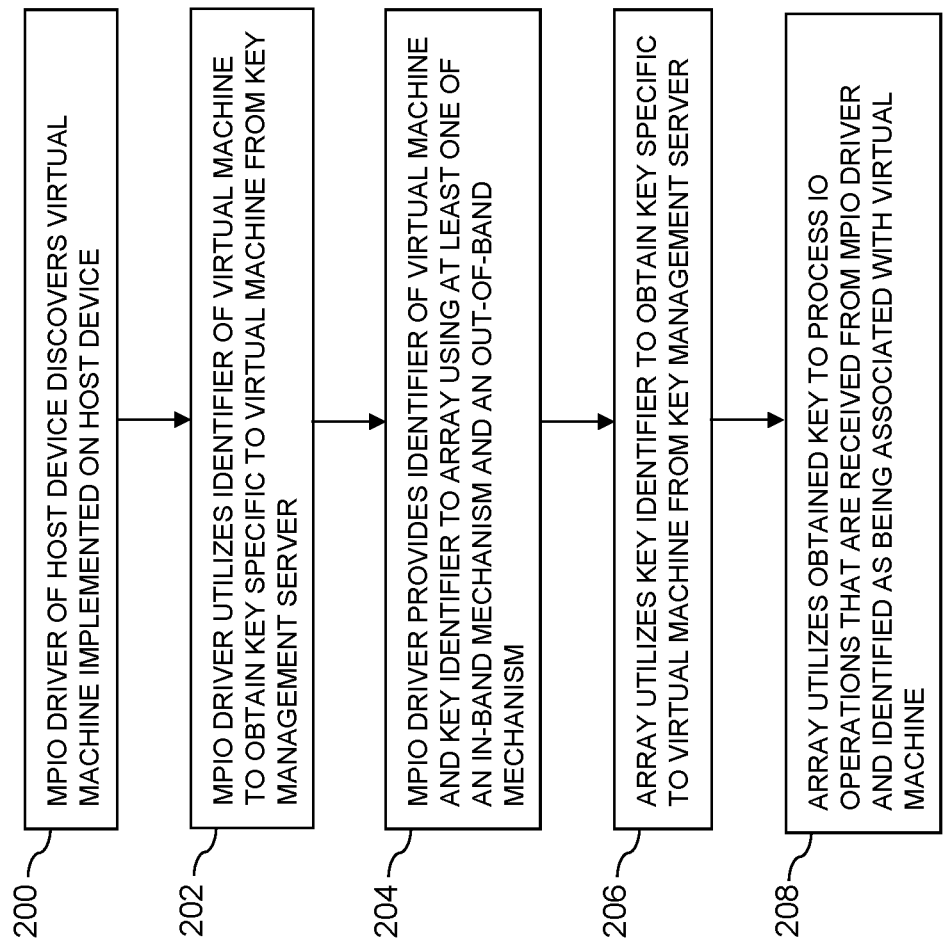
FIG. 2 is a flow diagram of a process for logical storage device access in an encrypted storage environment in an illustrative embodiment.

One or more of the steps of the FIG. 2 process are illustratively performed at least in part by or under the control of one or more host devices, collectively including a multi-path layer comprising one or more MPIO drivers, as well as a storage array or other storage system, and one or more additional components including a host management system and a key management server. Other arrangements of additional or alternative system components can be configured to perform at least portions of one or more of the steps of the FIG. 2 process in other embodiments. For example, as indicated previously, the host management system 116 in some embodiments can comprise an MPIO management station, and such an MPIO management station can be used to perform at least portions of the disclosed functionality.

The steps shown in FIG. 2 more specifically relate to providing a host device, referred to in the following description as simply a "host," with access to encrypted data of a logical storage device of a storage array, referred to in the following description as simply an "array." Similar processes can be implemented for other arrangements of components, such as multiple host devices that share the array, with such host devices being arranged in a common cluster subject to management by a host management system.

In step 200, an MPIO driver of a host device discovers a virtual machine implemented on the host device. The virtual machine may be an existing or newly-created virtual machine, and is assumed to be associated with at least one virtual storage volume supported by the array. Each virtual machine can be associated with a plurality of virtual volumes, or only a single virtual storage volume. Each such virtual storage volume may be viewed as an example of a particular type of logical storage volume, and is more generally referred to herein as a "logical storage device."

In step 202, the MPIO driver utilizes an identifier of the virtual machine to obtain a key specific to the virtual machine from a key management server. Such a key is also referred to herein as a per-VM key. In some embodiments, the MPIO driver first determines whether or not the virtual machine is encryption enabled, prior to attempting to obtain the per-VM key for the virtual machine. For example, the MPIO driver can obtain virtual machine characterizing information such as an encryption status indicator for the virtual machine, and make the determination based at least in part on the encryption status indicator. If the virtual machine is encryption enabled, the MPIO driver utilizes a UUID or other identifier of the virtual machine to obtain a per-VM key from the key management server.

In step 204, the MPIO driver provides the identifier of the virtual machine and a corresponding key identifier of the per-VM key to the array using at least one of an in-band mechanism and an out-of-band mechanism. Examples of such mechanisms are described in more detail elsewhere herein. Additional or alternative information, such as the above-noted encryption status indicator for the virtual machine, can also be provided by the MPIO driver to the array.

In step 206, the array utilizes the key identifier to obtain the key specific to the virtual machine from the key management server. The key identifier and the per-VM key are illustratively stored in a data structure of the array, for example, in association with the identifier of the virtual machine.

In step 208, the array utilizes the obtained per-VM key to process IO operations that are received from the MPIO driver and identified as being associated with the virtual machine. In some embodiments, the kernel-space portion of the MPIO driver of the host device implements a host encryption engine for its corresponding host device for performing encryption and decryption of data of at least one virtual storage volume or other logical storage device associated with the virtual machine, using the per-VM key.

Encrypted data can therefore be written to and read from the logical storage device associated with the virtual machine by the MPIO driver of the host device using the per-VM key. Such writes and reads of encrypted data of the logical storage device associated with the virtual machine are examples of what are more generally referred to herein as IO operations. The MPIO driver of the host device illustratively obtains such an IO operation from an application executing on that virtual machine of the host device and sends the IO operation from the host device to the array over a selected path. It is assumed in the present embodiment that the MPIO driver of the host device controls the delivery of storage access protocol commands from the host device to the array over selected paths through the SAN.

Moreover, the array also has access to the per-VM key for the virtual machine, and can therefore perform operations such as compression and deduplication on unencrypted data of the one or more virtual storage volumes or other logical storage devices associated with the virtual machine while still supporting end-to-end encryption of such logical storage devices between the host device and the array in the encrypted storage environment.

The process as shown is illustratively repeated for each of a plurality of virtual machines discovered by the MPIO driver. It can also be repeated under particular conditions such as responsive to responsive to a reboot of the host device and/or creation of new virtual machines and associated logical storage devices.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for logical storage device access. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different logical storage device access arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
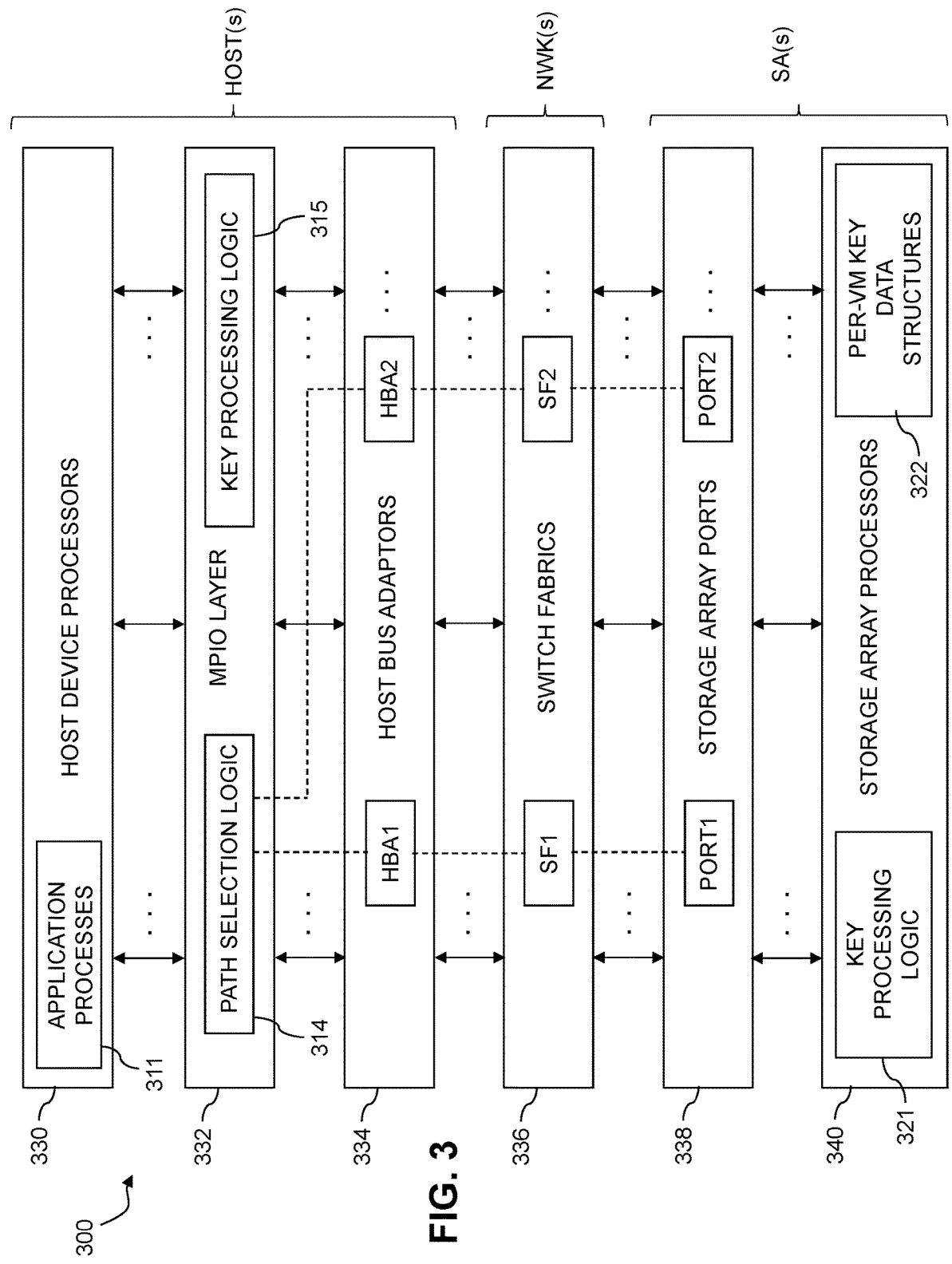
FIG. 3 is a block diagram showing multiple layers of a layered system architecture that incorporates functionality for logical storage device access in an encrypted storage environment in an illustrative embodiment.

Referring now to FIG. 3, another illustrative embodiment is shown. In this embodiment, an information processing system 300 comprises host-side elements that include application processes 311, path selection logic 314 and key processing logic 315, and storage-side elements that include key processing logic 321 and corresponding per-VM key data structures 322. The per-VM key data structures 322 in some embodiments each include, for example, virtual machine identifiers, encryption status indicators and per-VM keys for respective virtual machines, as illustrated in conjunction with the FIG. 4 embodiment to be described below. Additional or alternative information can be included in the per-VM key data structures 322 in other embodiments.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs"). The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336, using logical storage device access in an encrypted storage environment as disclosed herein. Paths are determined by the path selection logic 314 for sending such IO operations to the one or more storage arrays. These IO operations illustratively involve writing or reading encrypted data from one or more encrypted logical storage devices.

The MPIO layer 332 is an example of what is also referred to herein as a multi-path layer, and comprises one or more MPIO drivers implemented in respective host devices. Each such MPIO driver illustratively comprises respective instances of path selection logic 314 and key processing logic 315 configured as previously described. Additional or alternative layers and logic arrangements can be used in other embodiments.

In a manner similar to that described elsewhere herein, the MPIO layer 332 comprising key processing logic 315 illustratively manages a plurality of IO operations generated by a given host device. The IO operations are sent by the MPIO layer 332 to a storage array over respective paths selected using one or more algorithms implemented by path selection logic 314. Such IO operations are assumed to include writes of encrypted data to one or more logical storage devices associated with a given virtual machine and reads of encrypted data from the one or more logical storage devices associated with the given virtual machine.

At least one storage array in the system 300 receives, from at least one host device in the system 300, information that identifies (i) a particular virtual machine implemented by the host device and (ii) a key specific to the virtual machine. The storage array utilizes at least a portion of the received information to obtain the key specific to the virtual machine from a key management server external to the storage array. The key management server is not explicitly shown in the figure. The storage array stores the obtained key in the storage array in association with one or more parts of the received information, and utilizes the obtained key to process IO operations that are received in the storage array from the host device and that are identified as being associated with the virtual machine. The IO operations illustratively include both write and read operations involving encrypted data.

In some embodiments, responsive to receipt of at least one IO operation from a host device relating to at least one of reading or writing encrypted data of a virtual storage volume or other logical storage device associated with a virtual machine, the storage array utilizes the obtained key to access the encrypted data in unencrypted form in the storage array. For example, the storage array can utilize the obtained key to access the encrypted data in unencrypted form in the storage array in order to perform data services such as compression and duplication on the corresponding data of the logical storage device.

Such storage-side operations are illustratively performed using instances of key processing logic 321 and associated per-VM key data structures 322 in the storage array. Corresponding host-side operations are illustratively performed using path selection logic 314 and key processing logic 315 of the host devices. Other key processing logic instances in other system components, such as in a host management system not explicitly shown in FIG. 3, may additionally or alternatively be used.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays. The IO operations illustratively involve one or more host devices writing encrypted data to one or more logical storage devices and/or reading encrypted data from one or more logical storage devices. Such encrypted logical storage device access is controlled at least in part by host-side key processing logic 315 operating in conjunction with storage-side key processing logic 321, using information stored in one or more of the per-VM key data structures 322.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Figure 4:
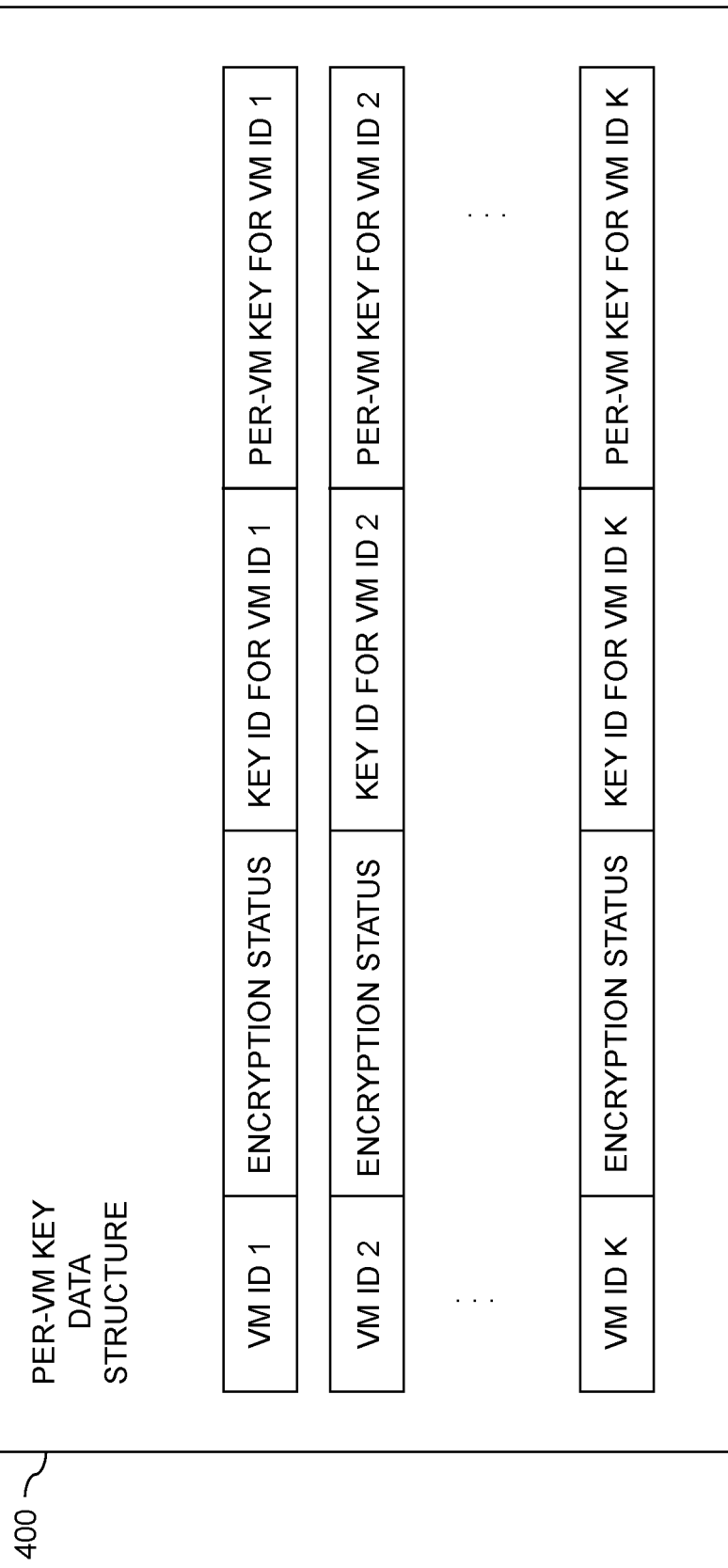
FIG. 4 shows an example data structure utilized in implementing logical storage device access in an encrypted storage environment in an illustrative embodiment.

Referring now to FIG. 4, an example per-VM key data structure 400 utilized in providing logical storage device access in an encrypted storage environment user per-VM keys as disclosed herein is shown.

In the example per-VM key data structure 400, which may be viewed as one of the per-VM key data structures 122 of the FIG. 1 embodiment or one of the per-VM key data structures 322 of the FIG. 3 embodiment, a storage array stores information characterizing a plurality of virtual machines associated with one or more host devices.

The stored information of the per-VM key data structure 400 more particularly comprises, for each of K virtual machines, an identifier ("ID") of the virtual machine, an encryption status indicator for the virtual machine, a key identifier for a per-VM key of the virtual machine, and the per-VM key itself. Each such virtual machine is assumed to be associated with at least one virtual storage volume or other logical storage device of the storage array that maintains the per-VM key data structure 400. The per-VM keys are illustratively obtained from a key management server using their respective key identifiers. It is assumed that key management servers as disclosed herein are configured to implement appropriate authentication mechanisms or other appropriate security controls of a type well known in the art in conjunction with providing per-VM keys to a host device or storage array.

Different instances of the per-VM key data structure 400 are similarly maintained for each of a plurality of different sets of one or more virtual machines associated with logical storage devices of the storage array, for example, with each such instance of the per-VM key data structure 400 being associated with the set of one or more virtual machines implemented by a different host device.

The particular per-VM key data structure arrangement shown in FIG. 4 is only an example, and numerous other types and arrangements of per-VM key data structures can be utilized in other embodiments.

Furthermore, the above-described processes, algorithms and other features and functionality disclosed herein are presented by way of illustrative example only, and other embodiments can utilize additional or alternative arrangements.

Also, as mentioned previously, different instances of the above-described processes, algorithms and other logical storage device access techniques can be performed using different system components. For example, various aspects of logical storage device access functionality in some embodiments can be implemented at least in part using one or more servers that are external to a storage array 105 or other type of storage system. Also, key processing logic can be implemented using other types of host drivers, such as, for example, iSCSI drivers, or more generally other host device components.

The particular logical storage device access arrangements described above are therefore presented by way of illustrative example only. Numerous alternative arrangements of these and other features can be used in implementing the logical storage device access in other illustrative embodiments.

As indicated previously, the illustrative embodiments disclosed herein can provide a number of significant advantages relative to conventional arrangements.

For example, some embodiments are advantageously configured to provide enhanced access to logical storage volumes or other types of logical storage devices in encrypted storage environments, using SCSI access protocols, NVMe access protocols and/or other storage access protocols.

Some embodiments provide a PSA level end-to-end encryption solution within VMware for vVols. Such arrangements overcome the drawbacks of conventional VMware VM level encryption arrangements.

Moreover, some embodiments overcome drawbacks of conventional techniques at least in part by allowing the storage system to implement data services such as compression and deduplication relating to data of one or more encryption-enabled logical storage devices.

Various aspects of functionality associated with logical storage device access in an encrypted storage environment as disclosed herein can be implemented in a storage system, in a host device, or partially in a storage system and partially in a host device, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, or VxBlock™ converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102 and storage array 105 are illustratively implemented in the form of software running on one or more processing devices. As a more particular example, the instances of path selection logic 114 and key processing logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, virtual machines, IO queues, MPIO drivers, path selection logic, initiators, targets, key processing logic, key data structures, and additional or alternative components. Also, the particular configurations of system and device elements and associated processing operations illustratively shown in the drawings can be varied in other embodiments. For example, a wide variety of different host device and storage system configurations and associated logical storage device access arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   wherein the at least one processing device is configured:
   to receive in a storage system, from a multi-path input-output driver of a host device, information that identifies (i) a particular virtual machine implemented by the host device and (ii) a key specific to the virtual machine;
   to utilize at least a portion of the received information to obtain in the storage system the key specific to the virtual machine from a key management server external to the storage system;
   to store the obtained key in the storage system in association with one or more parts of the received information; and
   to utilize the obtained key to process input-output operations that are received in the storage system from the host device and that are identified as being associated with the virtual machine;
   wherein the multi-path input-output driver of the host device is configured to obtain the key specific to the virtual machine from the key management server.

2. The apparatus of claim 1 wherein the at least one processing device comprises at least a portion of the storage system.

3. The apparatus of claim 2 wherein the at least one processing device further comprises at least a portion of at least one of the host device, one or more additional host devices, and a host management system that is configured to manage the host devices.

4. The apparatus of claim 1 wherein the virtual machine implemented by the host device comprises at least one virtual storage volume.

5. The apparatus of claim 1 wherein a user-space portion of the multi-path input-output driver of the host device obtains the key specific to the virtual machine and provides the key specific to the virtual machine to a kernel-space portion of the multi-path input-output driver of the host device.

6. The apparatus of claim 5 wherein the kernel-space portion of the multi-path input-output driver of the host device implements a host encryption engine configured to perform encryption and decryption of data of at least one logical storage volume associated with the virtual machine using the key specific to the virtual machine.

7. The apparatus of claim 1 wherein the received information comprises:
   an identifier of the virtual machine;
   an identifier of the key specific to the virtual machine; and
   information characterizing an encryption status of the virtual machine.

8. The apparatus of claim 7 wherein the information characterizing the encryption status of the virtual machine comprises an encryption status indicator that is part of metadata of the virtual machine.

9. The apparatus of claim 7 wherein the at least one processing device is further configured to store one or more of the identifier of the virtual machine, the identifier of the key specific to the virtual machine, and the information characterizing the encryption status of the virtual machine in at least one of:
- a data structure of the storage system; and
- a self-describing header of at least one logical storage device associated with the virtual machine.

10. The apparatus of claim 7 wherein at least a portion of the received information is received in the storage system via an out-of-band mechanism comprising at least one application programming interface (API).

11. The apparatus of claim 7 wherein at least a portion of the received information is received in the storage system via an in-band mechanism comprising at least one command issued by the multi-path input-output driver of the host device.

12. The apparatus of claim 11 wherein the at least one command comprises at least one command of a storage access protocol utilized by the host device to access the storage system over a network.

13. The apparatus of claim 12 wherein the at least one command comprises a particular command descriptor block that is configured to include the identifier of the key specific to the virtual machine.

14. The apparatus of claim 1 wherein the at least one processing device is further configured:
- to receive a given one of the input-output operations;
- to determine a virtual machine identifier for the given input-output operation; and
- to utilize the virtual machine identifier to access at least one data structure within the storage system to obtain the key specific to the virtual machine for use in processing the given input-output operation.

15. A computer program product comprising a non-transitory processor-readable storage medium having stored therein program code of one or more software programs, wherein the program code, when executed by at least one processing device comprising a processor coupled to a memory, causes the at least one processing device:
- to receive in a storage system, from a multi-path input-output driver of a host device, information that identifies (i) a particular virtual machine implemented by the host device and (ii) a key specific to the virtual machine;
- to utilize at least a portion of the received information to obtain in the storage system the key specific to the virtual machine from a key management server external to the storage system;
- to store the obtained key in the storage system in association with one or more parts of the received information; and
- to utilize the obtained key to process input-output operations that are received in the storage system from the host device and that are identified as being associated with the virtual machine;
wherein the multi-path input-output driver of the host device is configured to obtain the key specific to the virtual machine from the key management server.

16. The computer program product of claim 15 wherein the received information comprises:
- an identifier of the virtual machine;
- an identifier of the key specific to the virtual machine; and
- information characterizing an encryption status of the virtual machine.

17. The computer program product of claim 15 wherein the program code, when executed by the at least one processing device, further causes the at least one processing device:
- to receive a given one of the input-output operations;
- to determine a virtual machine identifier for the given input-output operation; and
- to utilize the virtual machine identifier to access at least one data structure within the storage system to obtain the key specific to the virtual machine for use in processing the given input-output operation.

18. A method comprising:
receiving in a storage system, from a multi-path input-output driver of a host device, information that identifies (i) a particular virtual machine implemented by the host device and (ii) a key specific to the virtual machine;
utilizing at least a portion of the received information to obtain in the storage system the key specific to the virtual machine from a key management server external to the storage system;
storing the obtained key in the storage system in association with one or more parts of the received information; and
utilizing the obtained key to process input-output operations that are received in the storage system from the host device and that are identified as being associated with the virtual machine;
wherein the multi-path input-output driver of the host device is configured to obtain the key specific to the virtual machine from the key management server.

19. The method of claim 18 wherein the received information comprises:
an identifier of the virtual machine;
an identifier of the key specific to the virtual machine; and
information characterizing an encryption status of the virtual machine.

20. The method of claim 18 further comprising:
receiving a given one of the input-output operations;
determining a virtual machine identifier for the given input-output operation; and
utilizing the virtual machine identifier to access at least one data structure within the storage system to obtain the key specific to the virtual machine for use in processing the given input-output operation.

* * * * *